United States Patent [19]

Bandat

[11] Patent Number: 5,819,022
[45] Date of Patent: Oct. 6, 1998

[54] METHOD FOR RE-EXECUTING A PROCESS ON A COMPUTER SYSTEM FOR FAULT CORRECTION

[75] Inventor: Kurt Bandat, Wien, Austria

[73] Assignee: International Business Machines Corporation, Armonk, N.Y.

[21] Appl. No.: 515,665

[22] Filed: Aug. 15, 1995

[30] Foreign Application Priority Data

Aug. 16, 1994 [EP] European Pat. Off. .............. 94112733

[51] Int. Cl.⁶ .................................................... G06F 11/00
[52] U.S. Cl. ................................ 395/182.14; 395/183.14
[58] Field of Search ........................ 395/183.13, 183.14, 395/712, 183.01, 181, 182.13, 182.14, 182.15, 701, 708; 364/130, 148

[56] References Cited

U.S. PATENT DOCUMENTS

| | | | |
|---|---|---|---|
| 4,807,108 | 2/1989 | Ben-Arieh et al. ...................... | 364/148 |
| 4,853,851 | 8/1989 | Horsch ................................. | 395/183.14 |
| 5,065,400 | 11/1991 | Masuishi et al. .................... | 395/183.14 |
| 5,524,241 | 6/1996 | Ghoneimy et al. ................. | 395/183.13 |
| 5,535,322 | 7/1996 | Hecht ................................... | 395/155 |
| 5,581,691 | 12/1996 | Hsu et al. ........................... | 395/182.13 |

OTHER PUBLICATIONS

Yukio et al "Fault Analysis Based on Fault Reporting in JST Software Development" 1991 IEEE, pp. 591–596.

Singh et al. "Automating workflows for service order processing Integrating AI and Database Technologies", 1994 IEEE, pp. 19–23.

Robert J. Evans "An Integrated C Programming Environment" CompCon 90 Gulla Improved Maintenance Support by Multi–Versic Visiulization.

Gulla "Improved Maintenance Support by Multi–Version Visualizations" IEEE 1992 pp. 376–383.

R.J. Evans, "An Integrated C Programming Environment," *Campcon Spring 90 Digest of Papers*, 26 Feb. –2 Mar. 1990, San Francisco US, pp. 356–359.

B. Gulla, "Improved Maintence Support by Multi–Version Visualizations," *Conference on Software Maintenance 1992 Proceedings*, 9 –12 Nov. 1992, Orlando US, IEEE Los Alamitos US, pp. 376–383.

*Primary Examiner*—Albert Decady
*Attorney, Agent, or Firm*—Prentiss Wayne Johnson

[57] ABSTRACT

A method for re-executing a process on a computer system is described wherein said process includes a number of activities which are executed by said computer system according to a workflow graph. Each of said activities requires for its execution at least one work item incarnation from another one of said activities, and each of said activities creates at least one work item incarnation to be used by another one of said activities. The method comprises the steps of a) identifying by a user one of said activities to be faulty and correcting it, b) evaluating by said computer system those ones of said activities which are influenced by said faulty activity with the help of said at least one work item incarnation created by said faulty activity, and c) executing by said computer system said corrected faulty activity and said evaluated activities according to said workflow graph. The described method has the advantage that all activities being incorrect due to the faulty activity are re-executed automatically by the computer system.

9 Claims, 4 Drawing Sheets

ACTIVITIES

ACTIVITY TYPE:   NAME_MODULES
                BUNDLE_SPLIT
                BUNDLE_JOIN
                DESIGN_MODULE
                CODE_MODULE
                COMPILE_MODULE
                LINK_MODULES
                CLOSE_DEVELOPMENT

*FIG. 1*

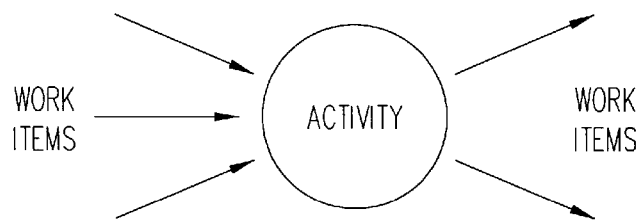

*FIG. 2*

WORK ITEMS

WORK ITEM TYPE:   MODULE
                  PROGRAM

*FIG. 3*

INCARNATIONS

| | |
|---|---|
| INCARNATION TYPE OF A WORK ITEM TYPE PROGRAM: | FUNCTIONS<br>LOAD_PROG |
| INCARNATION TYPE OF A WORK ITEM TYPE MODULE: | MOD_DES<br>MOD_CODE<br>MOD_OBJ |
| INCARNATION STATES OF AN INCARNATION TYPE MOD_DES: | NAMED<br>COMPL<br>APPR |

*FIG. 4*

FIG. 5A
FIG. 5B
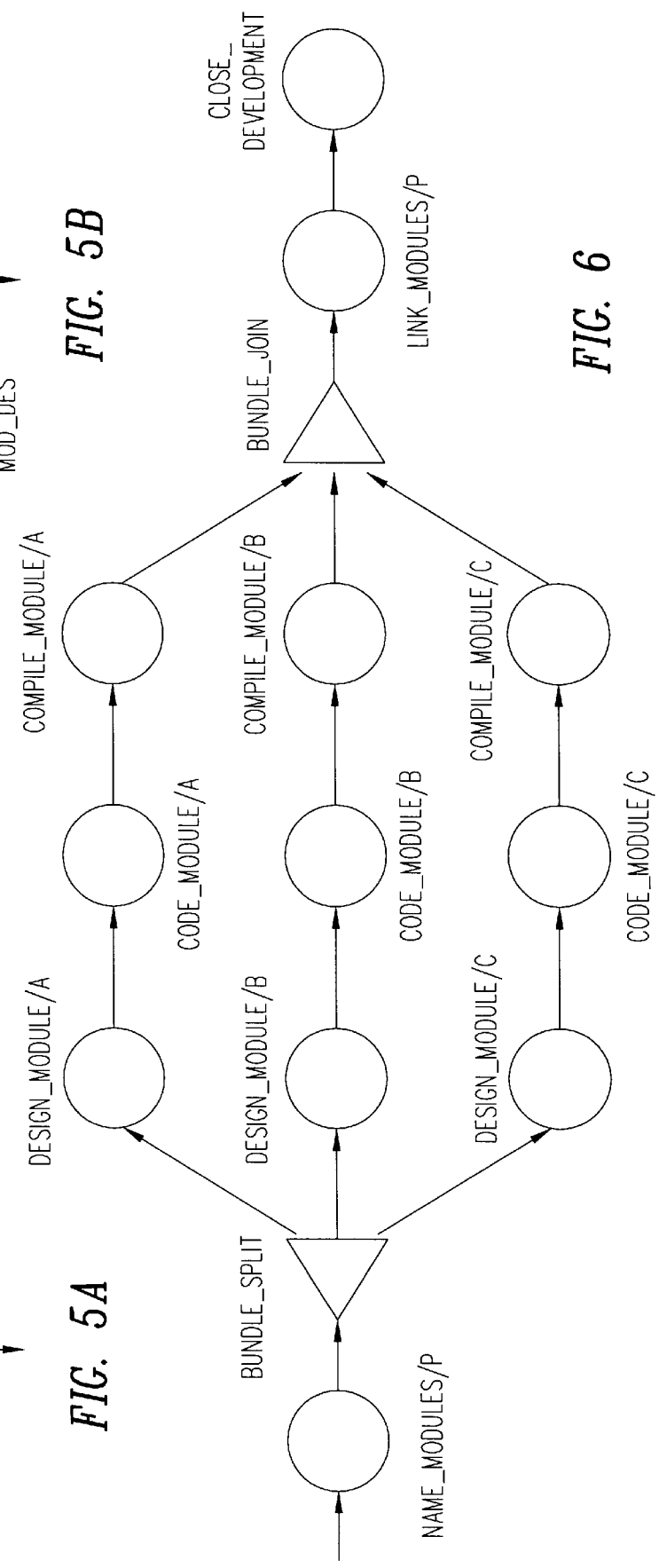
FIG. 6

FIG. 7A

| Name | V | F X | R | | V |
|------|---|-----|---|---|---|
| NAME_MODULES/P | | | | | |
| I:PROGRAM/P/INC:FUNCTIONS/APPR/V1 | V1 | | | | |
| O:MODULE/A/INC:MOD_DES/NAMED/V1 | | | | | |
| O:MODULE/B/INC:MOD_DES/NAMED/V1 | | | | | |
| O:MODULE/C/INC:MOD_DES/NAMED/V1 | | | | | |
| BUNDLE_SPLIT | | | | | |
| DESIGN_MODULE/A | V1.1 | | | | |
| I:MODULE/A/INC:MOD_DES/NAMED/V1 | V1.1 | | | | |
| O:MODULE/A/INC:MOD_DES/COMPL/V1.1 | | | | | |
| CODE_MODULE/A | V1.1.1 | | | | |
| I:MODULE/A/INC:MOD_DES/COMPL/V1.1 | | | | | |
| O:MODULE/A/INC:MOD_CODE/COMPL/V1.1.1 | | | | | |
| COMPILE_MODULE/A | V1.1.1.1 | | | | |
| I:MODULE/A/INC:MOD_CODE/COMPL/V1.1.1 | | | | | |
| O:MODULE/A/INC:MOD_OBJ/COMPL/V1.1.1.1 | | | | | |
| DESIGN_MODULE/B | V1.1 | X | | | |
| I:MODULE/B/INC:MOD_DES/NAMED/V1 | | | | | |
| O:MODULE/B/INC:MOD_DES/COMPL/V1.1 | | | | | |
| CODE_MODULE/B | V1.1.1 | F | | | |
| I:MODULE/B/INC:MOD_DES/COMPL/V1.1 | | F | | | |
| O:MODULE/B/INC:MOD_CODE/COMPL/V1.1.1 | | | | | |
| COMPILE_MODULE/B | V1.1.1.1 | F | | | |
| I:MODULE/B/INC:MOD_CODE/COMPL/V1.1.1 | | F | | | |
| O:MODULE/B/INC:MOD_OBJ/COMPL/V1.1.1.1 | | | | | |
| DESIGN_MODULE/C | V1.1 | | | | |
| DESIGN_MODULE/B | | | R | | V1.2 |
| I:MODULE/B/INC:MOD_MOD_DES/NAMED/V1 | | | | | |
| O:MODULE/B/INC_MOD_MOD_DES/COMPL/V1.2 | | | | | |
| CODE_MODULE/B | | | R | | V1.2.1 |
| I:MODULE/B/INC:MOD_DES/COMPL/V1.2 | | | | | |
| O:MODULE/B/INC:MOD_CODE/COMPL/V1.2.1 | | | | | |
| COMPILE_MODULE/B | | | R | | V1.2.1.1 |
| I:MODULE/B/INC:MOD_CODE/COMPL/V1.2.1 | | | | | |
| O:MODULE/B/INC:MOD_OBJ/COMPL/V1.2.1.1 | | | | | |

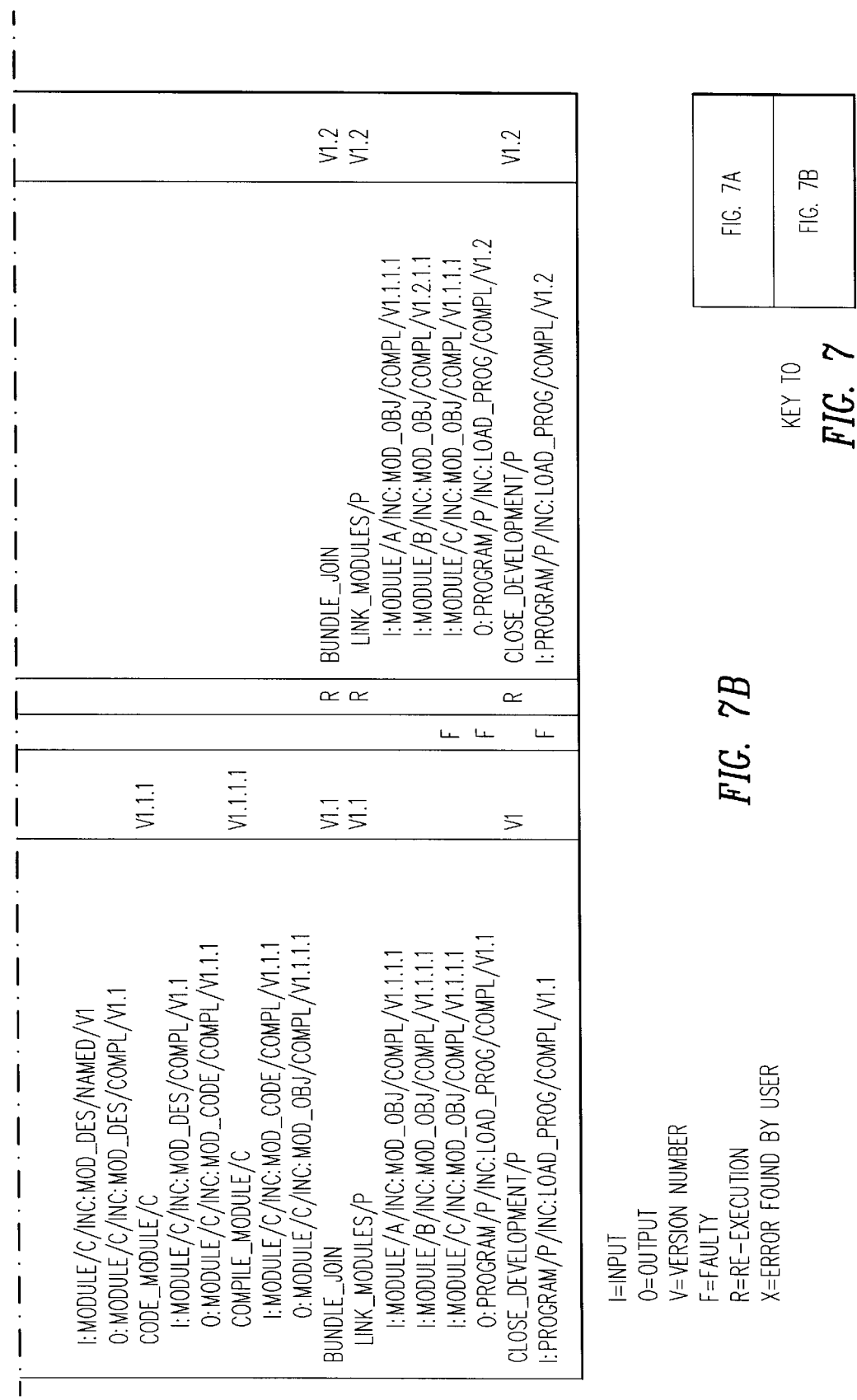

METHOD FOR RE-EXECUTING A PROCESS ON A COMPUTER SYSTEM FOR FAULT CORRECTION

BACKGROUND OF THE INVENTION

1. Field of the Invention

The invention relates to a method for re-executing a process on a computer system for fault correction wherein said process includes a number of activities which are executed by said computer system according to a workflow graph, wherein each of said activities requires for its execution at least one work item from another one of said activities, and wherein each of said activities creates at least one work item to be used by another one of said activities.

2. Description of the Related Art

In the technical area of data processing many application processes are described by workflow graphs. Such a directed workflow graph represents a network of activities which are linked e.g., by control flow connectors. The control flow connectors in the workflow graph are so directed as to sequence the execution of activities in consistency with the direction of the graph. Each individual activity uses work items as an input and delivers work items as an output. These work items have to be in a well defined state when an activity is started or ended. The activities as such in most cases need a user for their execution. Typical activities in the area of software development are e.g., the design of a software module or the coding of such a software module.

Such workflow graphs can be executed by so-called workflow manager programs, e.g., by the "IBM® FLOW-MARK™" product "IBM is a registered trademark of International Business Machines Corporation and FLOWMARK is a trademark of International Business Machines Corporation."

During the execution of the above mentioned activities, e.g. during the design of a software module, sometimes the situation occurs that one of the work items delivered by the executed activity is found to be incorrect at some point in time later in the process. At this later point in time the faulty activity delivering the faulty work item has already been completed and process has been continued. Therefore, it is possible that the faulty activity causes a number of other activities to be incorrect due to a faulty input.

When the faultiness of an activity has been detected by the user its correction requires not only the correction of the faulty activity but also the correction of all other activities which were caused to be incorrect due to the faulty work item delivered by the faulty activity. As a consequence, the correction requires the re-execution of parts of the already executed workflow graph until all faulty activities and all faulty work items are repaired. Until now, such re-execution is done manually by the user.

SUMMARY OF THE INVENTION

It is the object of the invention to provide a method for re-executing a workflow graph automatically.

The invention solves this object by a method as described above with the further steps of: a) identifying by a user one of said activities to be faulty and correcting it, b) evaluating by said computer system those ones of said activities which are influenced by said faulty activity with the help of said at least one work item created by said faulty activity, c) executing by said computer system said corrected faulty activity and said evaluated activities according to said workflow graph.

More detailed, the invention solves this object by a method as described above with the further steps of: a) on detection of a fault halting any further activity execution in the workflow graph and identifying by a user the first of said activities to be faulty, having delivered a faulty work item and correcting said faulty activity so that said faulty work item is delivered in a corrected form from said corrected activity, b) evaluating by said computer system those ones of said activities which are influenced by said faulty activity by the cause of said at least one work item created by said first faulty activity, c) executing by said computer system said evaluated activities, in the cases needed with the involvement of a user according to the sequences of said evaluated activities according to said direction of said workflow graph, d) resuming said halted execution of said workflow graph when all said evaluated activities have executed as said in step c).

The invention provides an advantageous method in which the computer system evaluates and controls the re-execution of the faulty activities automatically. The user does not have to evaluate which activities are faulty and which ones therefore have to be re-executed. In addition the user does not have to control such re-execution with regard to the sequence and/or the completeness. All this is done automatically by the computer system with the help of the work items. The computer system evaluates the work items which are delivered by the faulty activity. Then the computer system evaluates which other activities are influenced by these work items directly or indirectly. Finally, the computer system re-executes all those activities which have such influenced work items as an input. Again, the user does not have to need not select these work items or activities; work item's or activities are done by the computer system automatically, involving the user only in those cases where he is needed for executing said evaluated activities.

In an embodiment of the invention the evaluating step b) comprises the steps of: b1) evaluating by said computer system those ones of said activities which require for their execution said at least one work item created by said faulty activity, b2) evaluating by said computer system those ones of said work items which are created by said activities found in the preceding step, b3) evaluating by said computer system those ones of said activities which require for their execution said ones of said work items found in the preceding step, b4) repeating step b2) and step b3) until all activities are found which are influenced by said faulty activity.

More detailed, the evaluating step b) comprises the steps of b1) evaluating by said computer system those ones of said activities which succeed said first faulty activity and which require, for their execution said at least one faulty work item created by said first faulty activity, b2) evaluating by said computer system those ones of said work items which are created by said activities found in the preceding step, b3) evaluating by said computer system those ones of said activities which require for their execution said ones of said work items found in the preceding step, b4) repeating steps b2) and steps b3) until all activities are found which are influenced by said first faulty activity and had already been executed before said halting of execution of activities in the workflow graph.

This embodiment provides an advantageous method to evaluate all those activities which are influenced directly or indirectly by the work items of the faulty activity. The user need not evaluate these work items or activities; work item's or activities area evaluated by the computer system automatically, involving said user only in these cases where he is needed for executing said first faulty activity and said evaluated activities.

In another embodiment of the invention a version number is assigned to each one of said activities and the executing step c) further comprises the step of: assigning a new version number to said corrected faulty activity and said evaluated activities for distinguishing said corrected faulty activity and said evaluated activities from the respective corresponding activities executed formerly.

This embodiment provides an advantageous method to distinguish the faulty activities from the corrected activities. Such distinction is extendable to a number of successive versions when e.g., a "corrected" activity is found to be incorrect at a later point in time and therefore has to be re-executed a second time.

Furthermore, an advantageous computer system is provided for carrying out the above mentioned inventive methods. Such computer system comprises a memory, wherein said activities and said work items are stored in said memory, and wherein said work items are assigned to said activities, respectively. Additionally, said version numbers are stored in said memory, wherein said version numbers are assigned to said activities, respectively.

BRIEF DESCRIPTION OF THE DRAWINGS

Further advantages of the invention will be evident from the following description of an embodiment of the invention which is represented in the drawings.

FIG. 1 provides a list of possible activities of a workflow graph;

FIG. 2 shows the relationship between activities and work items in a schematic representation;

FIG. 3 provides a list of possible work items;

FIG. 4 provides a list of possible incarnations of the work items;

FIGS. 5A and 5B shows the relationship between work items and incarnations in a schematic representation;

FIG. 6 shows a workflow graph with a number of activities; and

FIGS. 7(A,B) shows a table of activities with the accompanying work items and incarnations as it is stored in a memory of a computer system.

DETAILED DESCRIPTION OF THE PREFERRED EMBODIMENTS

The workflow graph shown in FIG. 6 includes a number of activities which are linked by control flow connectors. This workflow graph defines a process wherein the activities of the workflow graph are executed by a user. After the execution of any of the activities, the process is continued according to the respective control flow connector in the workflow graph.

The process which is represented by the workflow graph of FIG. 6 represents the development of a piece of software and includes the development of three different software modules in parallel. The entire process will be described in further detail after the following description of FIGS. 1 to 5b.

FIG. 1 shows a list of possible activities with respective activity types. An activity with an activity type NAME MODULES enables the user to create a number of different module names which may be assigned to succeeding activities. An activity with an activity type BUNDLE SPLIT enables the user to split one process path in a number of different process paths. All these split process paths are distinguished from another by the different module names. An activity with an activity type BUNDLE JOIN enables the user to join together a number of different process paths into one process path. An activity with an activity type DESIGN MODULE enables the user to create the design of a software module according to given requirements. An activity with an activity type CODE MODULE enables the user to program the designed software module, i.e., to create the source code for the designed software module. An activity with an activity type COMPILE MODULE enables the user to compile the programmed software module, i.e., to create the object code of the programmed source code. An activity with an activity type LINK MODULES enables the user to link together the different compiled software modules, i.e., to create the linked object code of the different software modules. An activity with an activity type CLOSE DEVELOPMENT enables the user to finish the development of a piece of software.

FIG. 2 shows the relationship between activities and work items. Any of the above mentioned activities is actually done by the user. To start any of these activities, at least one work item is required as an input. For example, the activity with the activity type CODE MODULE needs the design of the respective software module to be programmed as an input, or the activity with the activity type LINK MODULES needs the object code of a number of different software modules as an input. After the execution of any of these activities, at least one work item is created as an output. For example, the activity with the activity type DESIGN MODULE creates the design of the respective software module as an output, or the activity with the activity type COMPILE MODULE creates the object code of the respective software module as an output.

Any of the activities may only be started as soon as all required work items are available, i.e., as soon as all those activities are finished which create work items for the respective activity to be started. As well, any of the activities may only be finished as soon as all output work items relating to the respective activity are created.

FIG. 3 shows a list of possible work items. A work item with a work item type MODULE relates to the different modules of the entire piece of software, i.e., describes the function of a respective module of the piece of software. A work item with a work item type PROGRAM relates to the result of the software development, i.e., describes the programmed piece of software.

FIG. 4 shows a list of possible incarnations for work items with respective incarnation types and possible states of incarnations. A work item has its own name, but it is only represented by its set of incarnations. A work item may possess several incarnations at the same time, as defined by the incarnation types for a work item type. Each incarnation of a specific work item may be in one of several incarnation states. All incarnations of a work item, or more precisely all instances of incarnation types for one instance of a work item type have the same work item name. An incarnation of type FUNCTIONS of a work item of type PROGRAM with the assumed name "P" contains the requirements for the discrete functions to be implemented in a set of modules. Incarnations of type MOD_DES, with assumed names "A", "B", and "C" contain the design for the named work items. An incarnation of type MOD_CODE contains for each incarnation of type MOD_DES the corresponding source code. An incarnation of type MOD_OBJ contains the object code as obtained from compiling the source code of the corresponding incarnation of type MOD_CODE. An incarnation of type LOAD_PROG of a work item of type PROGRAM contains the result of linking all incarnations of type MOD_OBJ for all work items of type MODULE. Any incarnation of a work item can be in any of a set of permitted states. An incarnation state NAMED represents that the work item and its first incarnation has been named. An incarnation state COMPL represents that an incarnation is completed. An incarnation type APPR represents that the incarnation is approved.

FIG. 5A shows the relationship between work items and their incarnations. An incarnation of type MOD_CODE of a work item of the type MODULE is the input for a certain activity. As already mentioned, a work item is changed by the activity, by creating a new incarnation of type MOD_OBJ for the same work item. The activity has used the incarnation MOD_CODE of the work item to create the incarnation MOD_OBJ for the work item.

FIG. 5B shows the relationship between incarnations of work items and the states of these incarnations. A work item incarnation with the state NAMED is input to a certain activity. The activity changes the state of that incarnation to COMPL, with the consequence that the work item continues to have an incarnation of type MOD_DES, but due to the execution of the activity now with a state changed from NAMED to COMPL.

As already described, FIG. 6 shows a workflow graph with a number of activities which are linked by control flow connectors. Such a workflow graph has the object to organize the work of one or more people. For example, if a software module has to be developed by one or more engineers, the workflow graph organizes the process of development. The workflow graph does not create any code of the software module. Such code is developed within the several activities of the workflow graph by the engineers.

At the beginning of the development of a PROGRAM named "P", an activity NAME_MODULES, using as input the incarnation of type FUNCTIONS of the work item "P" of type program, creates three work items of type MODULE, with the names "A", "B", and "C". These modules represent the development of three different pieces of software that are then linked together to become the incarnation LOAD_PROG of the work item of type PROGRAM, named "P". For that purpose, an activity BUNDLE_SPLIT creates three parallel threads of activities in the workflow graph for the development of each of the modules "A", "B", and "C". For each of these modules in the three parallel threads of the workflow graph, activities are provided for designing, coding and compiling the respective pieces of software. For the module "B", these activities are DESIGN_MODULE/B, CODE_MODULE/B, and COMPILE_MODULE/B. Then the incarnations of type MOD_OBJ of these modules "A", "B", and "C" are taken together again with the help of the activity BUNDLE_JOIN that combines the three parallel threads into one successor thread, where the three pieces of software are linked by an activity LINK_MODULES/P and at the end the development of the program "P" is closed by the activity CLOSE_DEVELOPMENT/P.

FIG. 7 shows a table of activities with the accompanying work items and incarnations as it is stored in a memory of a computer system.

A comparison shows that all activities of FIG. 6 are also listed in FIG. 7. Additionally, FIG. 7 includes further information concerning the work item incarnations which are input to each activity and which are output from each activity. A work item incarnation which is input to an activity is indicated with an "I" and a work item incarnation being output is indicated with an "O".

As an example, the activity "CODE_MODULE/B" has as an input the incarnation "MOD—DES" with the state "COMPL" of the work item named "B" of type MODULE, and as output the incarnation "MOD_CODE" with the state "COMPL" of the same module.

In another example, the activity "LINK_MODULES" has three input incarnations of type "MOD_OBJ" from the three work items of type "MODULE" named "A", "B", and "C", and one output incarnation of type "LOAD_PROG" of a work item of type "PROGRAM" named "P".

In a first column indicated with a "V" for "version number", every activity is provided with such a version number. In particular in the three parallel control paths, the version numbers are created in a kind of hierarchical manner to show the dependency of each activity from the respective previous activity.

A second column indicated with "F" for "faulty" and "X" for "error found by user" provides the following information. Let's assume that the output of the activity "CODE MODULE/B" is faulty. This means that the design of the software module "B" which was made by e.g., an engineer is not correct. Usually, it is not possible to find such an error at once. Instead, such errors are found later e.g., after the linkage of the whole software package. In any case, the error has to be found by a person and this person has then to indicate this error in the table of FIG. 7. This is shown by the "X" in FIG. 7 which indicates the relevant output work item incarnation which was found to be faulty, i.e., the work item incarnation "MODULE/B/INC:MOD_DES".

The "X" in the second column has the consequence that the computer system automatically searches for all activities which have the faulty work item incarnation, or any faulty incarnations derived from the first faulty incarnation as an input. In FIG. 7, this is the activity "CODE_MODULE/B", which has the faulty work item incarnation "MODULE/B/INC:MOD_DES" as input and creates the faulty work item incarnation "MODULE/B/INC:MOD_CODE" as output. The computer system indicates these input work item incarnations as well as output work item incarnations of the relevant activities with an "F" for being faulty.

Then the computer system repeats the similar procedure for all output work item incarnations which have now been indicated with an "F". This means that the computer system automatically searches for all activities which have faulty work item incarnations as an input. Again, the computer system indicates these input work item incarnations as well as all output work item incarnations of the relevant activities with an "F" for being faulty.

This procedure is repeated by the computer system until all activities are found which are influenced directly or indirectly by the activity which was found to be faulty by a person and which was indicated with a "X". At the end, all these influenced faulty activities are indicated with a "F".

In a next step, the computer system automatically re-executes all faulty activities. This is done by providing a "R" for "re-execution" in a third column of FIG. 7. The "R" has the consequence that all these activities have to be re-executed. In FIG. 7, the activities "DESIGN MODULE/B", "CODE MODULE/B", "COMPILE MODULE/B", "BUNDLE JOIN", "LINK MODULES/P" and "CLOSE DEVELOPMENT/P" have to be re-executed. The re-execution itself is done in the same way as the previous execution of the activities, i.e., an engineer develops the design of the module "B" under the activity "DESIGN MODULE/B", then an engineer develops the code for the designed software module under the activity "CODE MODULE/B", and so on. For this re-execution, the computer system is only the organizer so that all developments are made according the workflow graph of FIG. 6. However, the computer system is not the one who creates the design of the module or its code.

After the re-execution of the relevant activities, the computer system automatically provides an new version number to these re-executed activities. This is shown in another column in FIG. 7 which is indicated again with "V" for "version number". The new version numbers are different from the previous version numbers so that the computer system is able to distinguish the faulty activities from the re-executed activities.

It is possible that, after the re-executions, a person finds another faulty activity. This might be a re-executed activity or one of the other non-re-executed activities. If so, the computer system runs the same procedure as described by always using the latest, i.e., youngest version. All faulty activities are indicated with a "F" and a "R" again and are re-executed. Of course, it is possible that a re-executed activity is re-executed another time. Then, the computer system provides a new version number for the re-executed activities for distinguishing purposes. This process may be repeated as often as it is necessary whereby the table according to FIG. 7 in the memory of the computer system always provides the actual state of the software development as well as its history.

What is claimed is:

1. A method for re-executing a process on a computer system for fault correction
    wherein said process includes a number of activities which are executed by said computer system according to a workflow graph,
    wherein each of said activities requires for its execution at least one work item, in particular at least one work item incarnation, from another one of said activities,
    and wherein each of said activities creates at least one work item to be used by another one of said activities,
    said method comprising the steps of:
        a) identifying by a user one of said activities, in particular a first one of said activities, to be faulty and correcting it;
        b) evaluating by said computer system those ones of said activities which are influenced by said faulty activity with the help of said at least one work item created by said faulty activity; and
        c) executing by said computer system said corrected faulty activity and said evaluated activities according to said workflow graph.

2. The method according to claim 1, wherein said evaluating step b) comprises the steps of:
        b1) evaluating by said computer system those ones of said activities which require for their execution said at least one work item created by said faulty activity;
        b2) evaluating by said computer system those ones of said work items which are created by said activities found in the preceding step;
        b3) evaluating by said computer system those ones of said activities which require for their execution said ones of said work items found in the preceding step; and
        b4) repeating step b2) and step b3) until all activities are found which are influenced by said faulty activity.

3. The method according to claim 1
    wherein a version number is assigned to each one of said activities, and
    said executing step c) further comprises the step of:
        assigning a new version number to said corrected faulty activity and said evaluated activities for distinguishing said corrected faulty activity and said evaluated activities from the respective corresponding activities executed formerly.

4. A computer system for re-executing a process for fault correction, wherein said process includes a number of activities which are executed by said computer system according to a workflow graph,
    wherein each of said activities requires for its execution at least one work item, in particular at least one work item incarnation, from another one of said activities,
    and wherein each of said activities creates at least one work item to be used by another one of said activities,
    said computer system comprising:
        a) means for identifying by a user one of said activities, in particular a first one of said activities, to be faulty and correcting it;
        b) means for evaluating by said computer system those ones of said activities which are influenced by said faulty activity with the help of said at least one work item created by said faulty activity; and
        c) means for executing by said computer system said corrected faulty activity and said evaluated activities according to said workflow graph.

5. The computer system according to claim 4 wherein said evaluating means comprises:
        b1) means for evaluating by said computer system of those ones of said activities which require for their execution said at least one work item created by said faulty activity;
        b2) means for evaluating by said computer system of those ones of said work items which are created by said activities found in the preceding means;
        b3) means for evaluating by said computer system of those ones of said activities which require for their execution said ones of said work items found in the preceding means; and
        b4) means for repeating the evaluating of evaluating means b2) and evaluating means b3) until all activities are found which are influenced by said faulty activity.

6. The computer system according to claim 5 wherein a version number is assigned to each one of said activities, and
    said executing means c) further comprises:
        means for assigning a new version number to said corrected faulty activity and said evaluated activities for distinguishing said corrected faulty activity and said evaluated activities from the respective corresponding activities executed formerly.

7. An article of manufacture for use in a computer system said article of manufacture comprising a computer-readable storage medium having a computer program code embodied in said medium which may cause the computer to:
    re-execute a series of instructions for fault correction wherein said series of instructions includes a number of activities which are executed by said computer system according to a workflow graph, wherein each of said activities requires for its execution at least one work item, in particular at least one work item incarnation, from another one of said activities, and wherein each of said activities creates at least one work item to be used by another one of said activities, said work items are assigned to said activities, respectively, which may cause the computer to:

a) identify with the aid of a user one of said activities, in particular a first one of said activities, to be faulty and correcting it;

b) evaluate those ones of said activities which are influenced by said faulty activity with the help of said at least one work item created by said faulty activity; and c) execute said corrected faulty activity and said evaluated activities according to said workflow graph.

8. The article of manufacture of claim 7 wherein the computer program code may cause the computer to evaluate said influenced activities by causing the computer to:

b1) evaluate those ones of said activities which require for their execution said at least one work item created by said faulty activity;

b2) evaluate those ones of said work items which are created by said activities found in the preceding means;

b) evaluate those ones of said activities which require for their execution said ones of said work items found in the preceding means; and b4) repeat the evaluation in b2) and b) until all activities are found which are influenced by said faulty activity.

9. The article of manufacture of claim 7 wherein a version number is assigned to each one of said activities, and wherein the computer program code may cause the computer to assign a new version number to said corrected faulty activity and said evaluated activities for distinguishing said corrected faulty activity and said evaluated activities from the respective corresponding activities executed formerly.

\* \* \* \* \*